United States Patent [19]

Tabler

[11] 4,154,562
[45] May 15, 1979

[54] ADJUSTABLE WIDTH MOLDING APPARATUS FOR A FLAT-TOP BUN

[75] Inventor: Charles P. Tabler, Hamilton, Ohio

[73] Assignee: Kornylak Corporation, Hamilton, Ohio

[21] Appl. No.: 829,507

[22] Filed: Aug. 31, 1977

[51] Int. Cl.² .......................................... B29D 27/04
[52] U.S. Cl. ............................ 425/89; 264/DIG. 84; 425/224; 425/329; 425/471; 425/817 C
[58] Field of Search ............... 264/DIG. 84; 425/89, 425/115, 4 C, 817 C, 224, 329, 471

[56] References Cited
U.S. PATENT DOCUMENTS

| 3,809,512 | 5/1974 | Blackwell et al. | 425/817 C X |
| 3,836,298 | 9/1974 | Ernst | 425/817 C X |
| 4,005,958 | 2/1977 | Porter | 425/817 C X |
| 4,074,960 | 2/1978 | Dockray et al. | 425/817 C X |

Primary Examiner—Roy Lake
Assistant Examiner—Mark Rosenbaum
Attorney, Agent, or Firm—Thomas E. Beall, Jr.

[57] ABSTRACT

The pour plate that is inclined downwardly between the side conveyors of a U-shaped continuous molding tunnel is adjustable in width between the correspondingly adjustable side conveyors so as to selectively produce flat-top buns of foamed synthetic resin of a desired width within the range of adjustment. Interdigitating T-shaped fingers are transversely expandible to form the pour plate and have the gaps between the fingers closed by a cover sheet extending completely over the pour plate with sides being folded downwardly between the pour plate and side conveyors where they are attached to a bias that holds the cover sheet in stretched condition over the pour plate. The bottom cover web that travels with the foam may be folded or cut to the adjusted width of the pour plate. The interdigitated finger construction of the pour plate permits adjustment of the pour plate profile so as to correspond to the rise/time curve of the foam as it expands on our pour plate.

20 Claims, 6 Drawing Figures

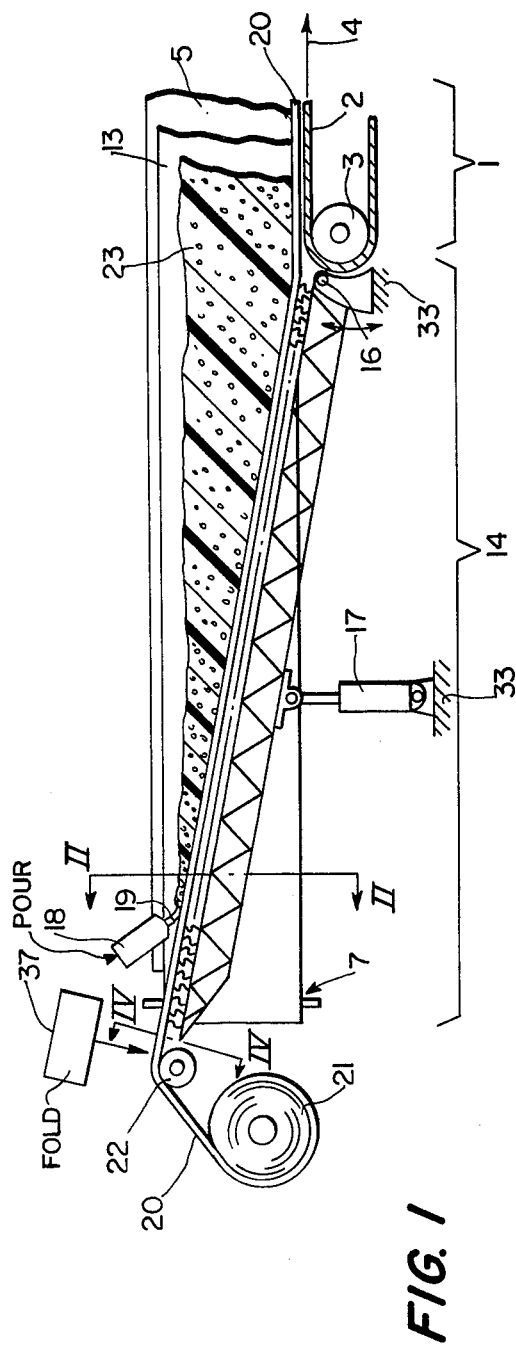
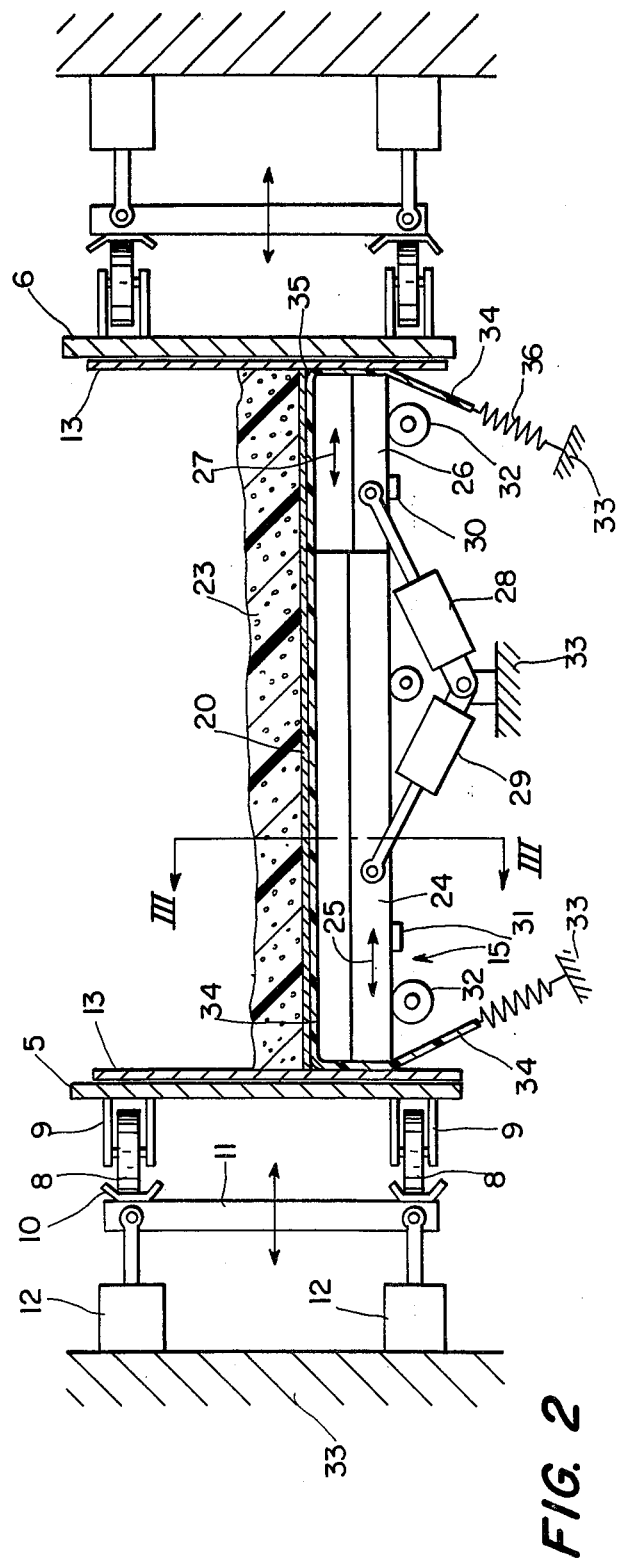
FIG. 1
FIG. 2

ADJUSTABLE WIDTH MOLDING APPARATUS FOR A FLAT-TOP BUN

BACKGROUND OF THE INVENTION

The present invention relates to the molding of a bun of synthetic resin material in an open top mold having a U-cross sectional shape.

The pour, rising and curing of foam within a U-shaped open top continuous mold will normally produce a round top for the foam bun due to the friction between the rising foam and the side walls of the mold. A flat top is desired to reduce wastage, and various apparatus have been produced to produce such a flat top. One such apparatus provides an inclined pour plate between the side conveyors of the mold for the full length of the foam expansion, so that the drop rate of the pour plate relative to the sides somewhat approximates the rise rate of the foam to reduce friction between the mold side walls and the foam.

Apparatus of this type may produce a bun four to eight feet wide, three to four feet high, and at the rate of 20 feet or 500 pounds per minute. Typically, the bun will be cut to a rectangular configuration and sliced for the required thickness of matresses. Matresses, for example, are desired in various widths.

SUMMARY

The opposed side conveyors that together with the main bottom conveyor form a moving U-shaped tunnel extend upstream from the main conveyor throughout the pouring and expanding zone of the molding apparatus. The inclined pour plate within this zone extends from adjacent the top of the side conveyors where the mix is poured downwardly to the bottom of the side conveyors where the pour plate joins the main conveyor, and therefore the pour plate extends between such side conveyors. The decline of the pour plate is chosen such that is will generally correspond to the rise rate of the foam at is moves along the pour plate such that the top of the foam will stay at substantially the same level on the side conveyors to form a flat top.

Interdigitated tranversely extending T-shaped fingers expand transversely to change the width of the pour plate, and have their top surface covered by a cover sheet that correspondingly adjusts in width due to its sides being folded down between the side conveyors and the pour plate to where they are tensioned. The side conveyors are correspondingly moved towards and away from each other to adjust the width.

The U-shaped mold is lined with webs of paper, and preferably the bottom web of paper is either folded to cut to change its effective width to correspond to the adjusted width of the pour plate. In this manner, the mold may be quickly changed to produce different width buns between runs, or changed during a run.

With the interdigitated construction of the fingers, they may easily be pivoted about transversely extending horizontal axes with respect to each other to form a contour and profile that will very accurately represent the rise curve of the foam, which contour may be changed manually or automatically to maintain a flat top of the bun, and for the same purposes, the overall general inclination of the pour plate may also be changed by pivoting the entire pour plate about a horizontal transverse axis closely adjacent to the main conveyor.

BRIEF DESCRIPTION OF THE DRAWINGS

FIG. 1 is a side elevation view of a molding apparatus constructed according to the present invention, partly in section and with the near vertical conveyor being removed;

FIG. 2 is a cross section through the apparatus of FIG. 1, taken on line II—II;

DETAILED DESCRIPTION

Figure 4:
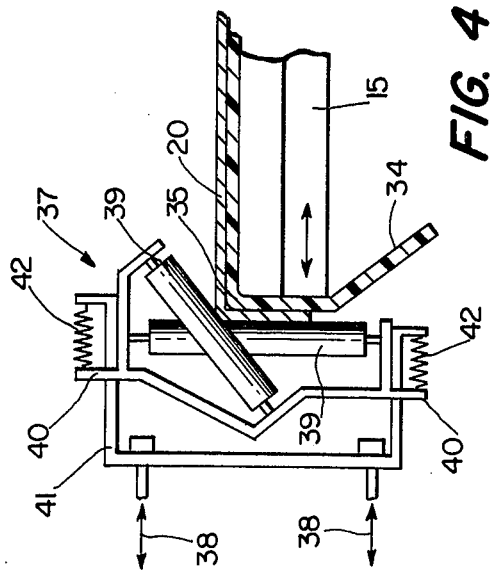
FIG. 4 is a partial cross sectional view taken along line IV—IV of FIG. 1.

Since the basic structure of an open top mold for continuously forming foamed synthetic buns is well known, only the pour plate of the present invention will be shown in detail in the drawings in association with a portion of the well known curing area of such a molding apparatus. In FIG. 1, the curing zone 1 is formed by a bottom rigid endless conveyor 2 with an upstream sprocket 3 used to drive it in the conveying direction 4. This conveyor 2 is of a width, as measured perpendicular to the plane of FIG. 1, that is equal to or greater than the maximum width of material to be produced. Opposite side, rigid and endless conveyors 5, 6 lie completely above and in engagement with the top surface of the main bottom conveyor 2 to therewith form a U-shaped molding tunnel moving in the conveying direction 4.

Since the side conveyors 5, 6 are mirror images of each other, only the side conveyor 5 will be described in detail. The side conveyor 5 is formed by a belt extending around opposite vertical axis sprockets 7 (only the upstream sprocket being shown) so as to provide a single vertically extending wall in the conveying direction 4 of a considerable distance upstream from the main conveyor 2 to the downstream discharge end of the main bottom conveyor 2. Along the length of each of the side conveyors 5, 6 and the main bottom conveyor 2, there are a plurality of rails or roller supports to back up and provide rigidity to the molding tunnel. Preferably, each of the conveyors 5, 6, 2 is formed of a plurality of metal slats pivotally connected to each other about axis transverse to their conveying direction 4, and a plurality of rollers 8 are rotatably mounted on brackets 9 rigidly secured to the back side of each or spaced ones of the slats forming the conveyors. Preferably, the rollers 8 engage in and are guided by guide channels or tracks 10. For one or both of the side conveyors, the tracks 10 are mounted on a frame 11, which frame also rotatably supports the sprockets 7. Any type of power device, such as hydraulic piston-cylinder arrangements 12, are employed to shift the entire side conveyor 5 toward and away from the side conveyor 6. The shifting of the side conveyor 5, which is horizontal and transverse to the conveying direction 5, is not inhibited by the conveyor 2, because the side conveyors 5, 6, as explained previously, lie on top of and in sliding engagement with the main conveyor 2. In this manner, the width of the molding tunnel within the curing zone 1 may be readily adjusted.

To prevent the synthetic resin, such as foam polyurethane, from adhering to the side conveyors 5, 6, each of the side conveyors 5, 6 is preferably covered with an indefinite length web of release paper 13 that is unrolled from an upstream coil supply (not shown) to travel with and overlie the side conveyors 5 and 6 through the mold for the full length of the side conveyors 5, 6.

After the bun of synthetic foam resin has been cured within the curing zone 1, it exits from the downstream end (not shown) of the apparatus where in a conventional manner the release paper may be removed and the bun cut to desired lengths, trimmed, and sliced to the desired thicknesses.

Upstream of the curing zone 1, there is a pouring and expanding zone 14. A pour plate 15 extends for the full length of the pouring and expanding zone 14 and completely between the side conveyors 5, 6. The downstream end of the pour plate 15 is pivoted on a horizontal axis 16 so that its angle of inclination with respect to the preferably horizontal surface of the main conveyor 2 may be adjusted by means of a hydraulic piston-cylinder 17. The chemicals, which are well known, are mixed at 18 and poured at 19 by conventional apparatus that forms per se no part of the present invention on to the upper upstream end of the pour plate 15, so that as they move in the conveying direction 4 such chemical mix will expand, that is foam, at a rate generally corresponding to the drop rate, that is the inclination, of the pour plate 15 relative to the side conveyors 5, 6. In this manner, the top surface of the foam will generally stay at the same position on the side conveyors throughout the entire pouring and expanding zone 14. In this manner, a flat top as opposed to a crown top is provided for the bun of foam resin being formed.

To prevent the resin from adhering to the pour plate and to the top of the main conveyor 2, and to assist movement of the expanding mix along the pour plate in the conveying direction 4, release paper 20 is unrolled from a coil storage 21, moved across a guide roll 22, and across the top surface of the pour plate 15 and the main conveyor 2 in an indefinite length continuously moving web to completely cover the area between the side conveyors 5, 6.

Figure 3:
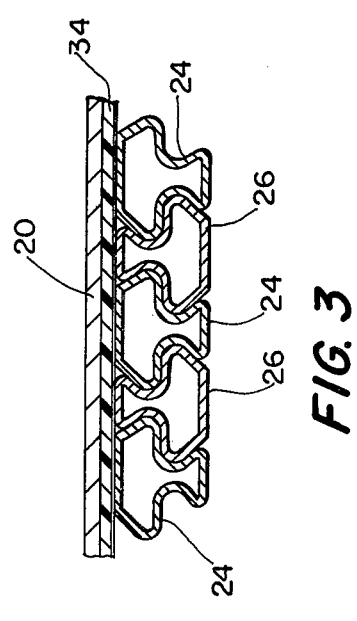
FIG. 3 is a partial cross sectional view taken along line III—III of FIG. 2.

As mentioned above, the distance between the side conveyor 5, 6 may be selectively changed to correspondingly change the width of the foam bun 23 being formed. The pour plate 15 is correspondingly expansible to always substantially completely support the release paper 20, when used, and expanding bun 23 within the pouring and expanding zone 14. To provide for such expansion and contraction of the pour plate 15, the pour plate 15 is constructed of a plurality of first fingers 24 interconnected to move transversely together in the direction of arrows 25 and a plurality of second fingers 26 interdigitated with first fingers 24. The second fingers 26 are interconnected to move together as a unit in the direction of the arrows 27. Hydraulic cylinders 28, 29 are provided to expand and contract the pour plate with power. Preferably, the cylinders 28, 29 are pneumatic and exert an expansion bias on the pour plate so that the pour plate will expand and contract automatically as the side conveyors 5, 6 move away from and toward each other, respectively. Preferably, the fingers 24, 26 are individually constructed by being cut to the desired length from an indefinite length stock material, preferably extruded aluminum, having a general T-shaped configuration as shown in FIG. 3. The length of each of the fingers 24, 25, as measured transverse the conveying direction 4 is preferably equal to the minimum width of the bun 23 to be formed and correspondingly the minimum adjustment spacing of the side conveyors 5, 6.

Figure 5:
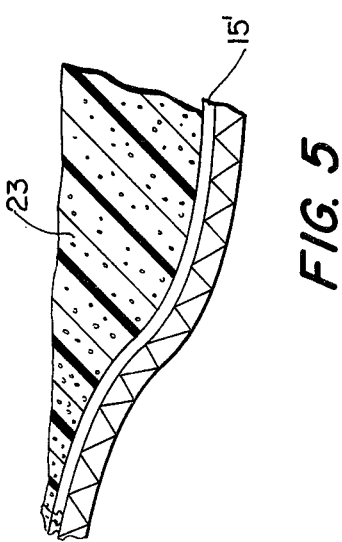
FIG. 5 is a partial elevation view of a portion of a pour plate adjustable contour that may be used in the apparatus of FIG. 1.

The fingers 26 are interconnected by means of one or more cross braces 30, which may be rigid for the embodiment of FIG. 1 and flexible for the embodiment of FIG. 5 (to be described later), while similarly the fingers 24 are interconnected by means of the cross brace 31. To guide the fingers during their expansion and contraction, horizontal axis idler rollers 32 are mounted on a fixed support frame 33 to engage and support the fingers.

When the pour plate is expanded, as viewed in FIG. 2, there will be small gaps between the fingers 27 to the right of the pour plate and between the fingers 24 to the left of the pour plate. If the release paper 20 does not provide sufficient support for the expanding resin at these gaps, a substantially thicker normally fixed cover sheet 34 is preferably used. The cover sheet 24 is of a thickness many times the thickness of the release paper 20, and preferably constructed of a flexible resin having a low coefficient of friction with respect to the release paper 2. The cover sheet 34 is generally of rectangular configuration having a length, as measured in the conveying direction 4, that is approximately equal to the length of the pour plate, and a width that is substantially greater than the maximum expanded width of the pour plate 15, so that the longitudinal sides of the cover sheet 34 are folded downwardly, about fold lines 35 so as to extend between the pour plate 15 and the side release paper 15. A spring bias 36 is schematically shown in FIG. 2 for such longitudinal sides of the cover sheet 34 for purposes of illustration, but preferably the construction is such that the longitudinal edges of the cover sheet 34 are weighted so that they are biased downwardly to stretch the cover sheet 34 tightly across the top of the pour plate 15. In this manner, the cover sheet 34 will always be stretched tightly across the top of the pour plate 15 automatically as the pour plate 15 is expanded and contracted.

Figure 6:
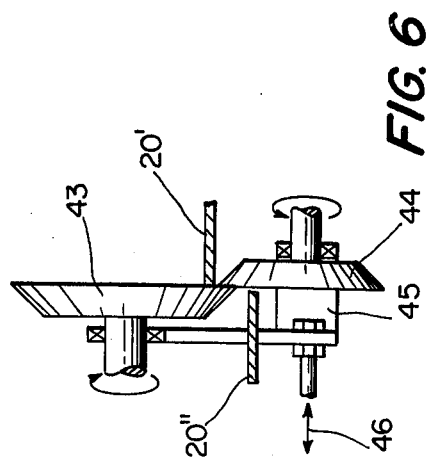
FIG. 6 is an end view of a paper cutter that may take the place of the paper folder shown in FIG. 4.

When the width of the bun 23 is changed by expanding or contracting the pour plate 15 and side conveyors 5, 6, it is most desirable to correspondingly change the width of the bottom cover paper web 20. This width change of the bottom paper web 20 may be accomplished by means of the apparatus of FIG. 4, a modification of the apparatus of FIG. 4, or the apparatus of FIG. 6. In FIG. 4, the web of cover paper 20 is folded downwardly along its longitudinal sides to correspond with the folding of the pour plate cover sheet 34 at fold lines 35 by the folding apparatus 37 found on each side of the top end of the pour plate 15. Such folding apparatus 37, as shown in FIG. 4, is bodily movable toward and away from the pour plate 15 to provide for width adjustment as shown by arrows 38. A plurality of guide rollers 39 are rotatably mounted at various angles to guide and fold the paper 20, and carried by a movable frame 40 that is slidably mounted on the adjustable frame 41 with a spring bias 42 therebetween. As the modification of this apparatus, a similar paper folder, which may be of the same or any similar conventional construction, may be used to fold the paper 20 upwardly instead of downwardly to form an upwardly opening U-shaped trough rather than a downwardly opening U-shaped trough. Instead of the folding apparatus of FIG. 4, there may be substituted the cutting apparatus of FIG. 6, wherein the paper 20 is cut to the desired width 20' with wastage 20" being removed, with such cutting being accomplished by conventional rotating cutter discs 43, 44 that are rotated about horizontal axes on a single frame 45 that may be moved as shown by arrows 46 transversely in the conveying direction 4 to produce different widths of paper web 20' corresponding to the adjusted width between the side conveyors 5, 6.

Instead of the fixed contour, in side elevation as shown in FIG. 1, of the pour plate 15 (shown in FIG. 1 as planar), there may preferably be provided a fixed or adjustable contour and elevation for the pour plate 15 that more closely approximates the rise/time curve of the expanding foam. Such a contour for the pour plate 15' is shown in FIG. 5. It is seen that the interdigitated finger construction described in detail above for the pour plate is particularly adapted for used in forming the pour plate contour of FIG. 5 in that each finger may be rotated about an axis parallel to its extent with respect to its adjacent finger quite easily to form a fixed contour, or an adjustable contour. With an adjustable contour, the interconnecting members 30, 31 may be flexible in a vertical plane and adjustably supported (not shown) along the length of the pour plate, and the conveying direction 4, so that the contour may be changed during operation of the molding apparatus. The change in the contour may be manual or automatic in response to sensors placed at various points along the pour plate to measure the height of the bun top during expansion.

The operation of the apparatus has been set forth along with its construction. Accordingly, the width of the bun 23 being formed may be selectively adjusted by expanding and contracting the pour plate 15 or 15', the side conveyors 5, 6, and the folding apparatus 37 or cutting apparatus 33; such width adjustment is accomplished while a flat top profile is maintained for the bun 23 by means of the inclined pour plate 15 or contoured pour plate 15' extending between the side conveyors 5, 6.

A preferred embodiment of the present invention has been set forth as the best mode of constructing the apparatus presently known, and for the desirable detail as shown therein, along with modifications and variations, with it being understood that further embodiments, modifications and variations are contemplated according to the broader aspects of the present invention, all as determined by the spirit and scope of the following claims.

What is claimed is:

1. Molding apparatus for continuously casting and curing a flat top foamed synthetic resin bun in an open U-shaped endless molding conveyor in a conveying direction, with adjustable width, comprising:

a main generally horizontally extending bottom conveyor for carrying the foamed synthetic resin bun while it cures in a curing zone;

two opposed side conveyors movable in the conveying direction for substantially the full length of said main bottom conveyor; said side conveyors and said main bottom conveyor providing a U-shaped mold;

at least one of said side conveyors being mounted above and spaced inwardly from its adjacent side of said main bottom conveyor, and movable toward and away from the other side conveyor to selectively change the width of the U-shaped mold;

said side conveyors extending upstream, with respect to the conveying direction, from said main bottom conveyor throughout a pouring and expansion zone, and being mounted for movement towards and away from each other corresponding to the movement towards and away from each other along said U-shaped mold for width adjustment;

an inclined pour plate extending upstream from the level of said main bottom conveyor upstream end for the entire length of the pouring and expansion zone to a height adjacent the upper edge of said side conveyors, and substantially completely spanning the space between said side conveyors for the full extent of the pouring and expansion zone; and means operatively associated with said pour plate for pouring a synthetic resin foamable mix at said pouring zone between said side conveyors and on to the upper end of said pour plate so that the mix will move down said pour plate through said pouring and expansion zone at a drop rate corresponding to the rise rate of the mix due to expansion so that the top most surface of the mix remains at the same position on said side conveyors during expansion as the foam moves in the conveying direction through said expansion zone; and said pour plate being expansible and contractible transversely of the conveying direction between said side conveyors within an adjustment range corresponding to the width adjustment movement of said side conveyors for the full length of said pouring and expansion zone;

power means operatively associated with said power plate for expanding and contracting said pour plate; and power means operatively associated with said side conveyors for expanding and contracting the width spacing between said side conveyors.

2. The molding apparatus of claim 1, including a stationary flexible cover sheet fixedly mounted with respect to said pour plate for completely covering said pour plate within said pouring and expansion zone, and having two opposite sides parallel to the molding direction, each side being folded downwardly between said pour plate and said side conveyors, respectively, said flexible cover sheet having a width, as measured transversely to the molding direction and including the folded down sides that exceeds the full expansion width of said expandible pour plate and said side conveyors.

3. The molding apparatus of claim 2, including means operatively associated with said cover sheet for biasing each of the opposite sides of said flexible cover sheet downwardly so that upon contraction of said pour plate and side conveyors, the flexible cover sheet will be stretched between its fold lines on each side, which fold lines will move towards its longitudinal center line, and further so that during expansion of said pour plate and side conveyors the cover sheet opposite side fold lines will move outwardly from the cover sheet longitudinal center line.

4. The molding apparatus of claim 2, including said pour plate including a plurality of parallel, interconnected, spaced apart, transversely extending first fingers, and a plurality of interconnected second fingers parallel to each other and extending transverse to the conveying direction so as to interdigitate with said first plurality of fingers; and said first and second fingers each having a length, in the direction transverse to the conveying direction, that is substantially equal to the minimum width of said expandible pour plate, and being mounted for relative movement transversely toward and away from each other for contraction and expansion of said pour plate.

5. The molding apparatus of claim 4, including each of said first fingers having a general T-shape and each of said second fingers having a generally inverted T-shape.

6. The molding apparatus of claim 4, including said pour plate as viewed in a vertical cross sectional plane taken parallel to the conveying direction having a shape inclined downwardly from said pouring means for a first portion in the conveying direction, for a second portion at a steeper angle than said first portion, and a third portion to said main bottom conveyor at an angle substantially less than said second portion all in a continuous uninterrupted manner for the full length of said pour plate to correspond to the rise/time curve of the foam.

7. The molding apparatus of claim 6, including said interdigitating fingers being mounted for relative pivoting between adjacent fingers about axes parallel to their extent to change contour of said pour plate; and means operatively associated with said fingers for supporting said fingers and relatively pivoting said fingers so as to selectively change the contour of said pour plate.

8. The molding apparatus of claim 7, including means operatively associated with said pour plate for pivotally mounting the downstream end of said pour plate immediately adjacent the upstream end of said main bottom conveyor; and power means operatively associated with said pour plate for pivoting said pour plate to increase and decrease the angle of inclination of said pour plate.

9. The molding apparatus of claim 2, including means operatively associated with said pour plate and said main bottom conveyor for providing an indefinite length bottom cover web to completely cover said pour plate, to cover said main bottom conveyor between said side conveyors, and to move with the expanding and curing foam resin; and means operatively associated with said side conveyors for providing an indefinite length of a side cover web on the inside of and to travel with each of said side conveyors, each including a storage roll of web material in coil form at the upstream end of each of said side conveyors.

10. The molding apparatus of claim 9, including means operatively associated with said means providing the bottom cover web to fold each longitudinal side of said bottom cover web downwardly to form a U-shape; and said means to fold being expansible and contractible transverse to the conveying direction so as to change the transverse distance between the bottom cover web fold lines at each side to correspond to the expansion and contraction of the pour plate.

11. The molding apparatus of claim 1, including said pour plate including a plurality of interconnected, parallel, spaced apart, transversely extending first fingers, and a plurality of interconnected second fingers parallel to each other and extending transverse to the conveying direction so as to interdigitate with said first plurality of fingers; and said first and second fingers each having a length, in the direction transverse to the conveying direction, that is substantially equal to the minimum width of said expansible pour plate, and being mounted for relative movement transversely toward and away from each other for contraction and expansion of said pour plate.

12. The molding apparatus of claim 11, including means operatively associated with said pour plate and with said main bottom conveyor for providing an indefinite length bottom cover web to completely cover said pour plate, to cover said main bottom conveyor between said side conveyors, and to move with the expanding and curing foam resin.

13. The molding apparatus of claim 12, including means operatively associated with said means providing a bottom cover web to fold each longitudinal side of said bottom cover web downwardly to form a U-shape; and said means to fold being expansible and contractible transverse to the conveying direction so as to change the transverse distance between the bottom cover web fold lines at each side to correspond to the expansion and contraction of the pour plate.

14. The molding apparatus of claim 11, including each of said first fingers having a general T-shape and each of said second fingers having a generally inverted T-shape.

15. The molding apparatus of claim 11, including said pour plate as viewed in a vertical cross sectional plane taken parallel to the conveying direction having a shape inclined downwardly from said pouring means for a first portion in the conveying direction, for a second portion at a steeper angle than said first portion, and a third portion to said main bottom conveyor at an angle substantially less than said second portion all in a continuous uninterrupted manner for the full length of said pour plate to correspond to the rise/time curve of the foam.

16. The molding apparatus of claim 15, including said interdigitating fingers being mounted for relative pivoting between adjacent fingers about axes parallel to their extent to change contour of said pour plate; and means operatively associated with said fingers for supporting said fingers and relatively pivoting said fingers so as to selectively change the contour of said pour plate.

17. The molding apparatus of claim 16, including means operatively associated with said pour plate for pivotally mounting the downstream end of said pour plate immediately adjacent the upstream end of said main bottom conveyor; and power means operatively associated with said pour plate for pivoting said pour plate to increase and decrease the angle of inclination of said pour plate.

18. Molding apparatus for continuously casting and curing a flat top foamed synthetic resin bun in an open U-shaped endless molding conveyor in a conveying direction, with adjustable width, comprising:

a main generally horizontally extending bottom conveyor for carrying the foamed synthetic resin bun while it cures in a curing zone;

two opposed side conveyors movable in the conveying direction for substantially the full length of said main bottom conveyor; said side conveyors and said main bottom conveyor providing a U-shaped mold;

at least one of said side conveyors being mounted above and spaced inwardly from its adjacent side of said main bottom conveyor, and movable toward and away from the other side conveyor to selectively change the width of the U-shaped mold;

said side conveyors extending upstream, with respect to the conveying direction, from said main bottom conveyor throughout an expansion zone, and being mounted for movement towards and away from each other corresponding to the movement towards and away from each other along said U-shaped mold for width adjustment;

an inclined pour plate extending upstream from the level of said main bottom conveyor upstream end within said expansion zone to a height adjacent the upper edge of said side conveyors, and substantially completely spanning the space between said side conveyors;

means operatively associated with said pour plate for depositing a synthetic resin foamable mix on the upper end of said pour plate so that the mix will move down said pour plate through said expansion zone at a drop rate corresponding to the rise rate of the mix due to expansion so that the top most surface of the mix remains at the same position on said side conveyors during expansion as the foam moves in the conveying direction through said expansion zone;

said pour plate being expansible and contractible transversely of the conveying direction between said side conveyors within an adjustment range corresponding to the width adjustment movement of said side conveyors;

power means operatively associated with said pour plate for expanding and contracting said pour plate;

power means operatively associated with said side conveyors for expanding and contracting the width spacing between said side conveyors;

a flexible cover sheet completely covering said pour plate within said expansion zone, and having two opposite sides parallel to the molding direction, each side being folded downwardly between said pour plate and said side conveyors, respectively, said flexible cover sheet having a width, as measured transversely to the molding direction and including the folded down sides that exceeds the full expansion width of said expandible pour plate and said side conveyors.

19. The molding apparatus of claim 18, including means operatively associated with said cover sheet for biasing each of the opposite sides of said flexible cover sheet downwardly so that upon contraction of said pour plate and side, the flexible cover sheet will be stretched between its fold lines on each side, which fold lines will move towards its longitudinal center line, and further so that during expansion of said pour plate and side conveyors the cover sheet opposite side fold lines will move outwardly from the cover sheet longitudinal center line.

20. Molding apparatus for continuously casting and curing a flat top foamed synthetic resin bun in an open U-shaped endless molding conveyor in a conveying direction, with adjustable width, comprising:

a main generally horizontally extending bottom conveyor for carrying the foamed synthetic resin bun while it cures in a curing zone;

two opposed side conveyors movable in the conveying direction for substantially the full length of said main bottom conveyor; said side conveyors and said main bottom conveyor providing a U-shaped mold;

at least one of said side conveyors being mounted above and spaced inwardly from its adjacent side of said main bottom conveyor, and movable toward and away from the other side conveyor to selectively change the width of the U-shaped mold;

said side conveyors extending upstream, with respect to the conveying direction, from said main bottom conveyor throughout an expansion zone, and being mounted for movement towards and away from each other corresponding to the movement towards and away from each other along said U-shaped mold for width adjustment;

an inclined pour plate extending upstream from the level of said main bottom conveyor upstream end within said expansion zone to a height adjacent the upper edge of said side conveyors, and substantially completely spanning the space between said side conveyors;

means operatively associated with said pour plate for depositing a synthetic resin foamable mix on to the upper end of said pour plate so that the mix will move down said pour plate through said expansion zone at a drop rate corresponding to the rise rate of the mix due to expansion so that the top most surface of the mix remains at the same position on said side conveyors during expansion as the foam moves in the conveying direction through said expansion zone;

said pour plate being expansible and contractible transversely of the conveying direction between said side conveyors within an adjustment range corresponding to the width adjustment movement of said side conveyors;

said pour plate including a plurality of parallel, interconnected, spaced apart, transversely extending first fingers, and a plurality of interconnected second fingers parallel to each other and extending transverse to the conveying direction so as to interdigitate with said first plurality of fingers;

said first and second fingers each having a length, in the direction transverse to the conveying direction, that is substantially equal to the minimum width of said expandible pour plate, and being mounted for relative movement transversely toward and away from each other for contraction and expansion of said pour plate;

said pour plate as viewed in a vertical cross sectional plane taken parallel to the conveying direction having a shape inclined downwardly from said pouring means for a first portion in the conveying direction, for a second portion at a steeper angle than said first portion, and a third portion to said main bottom conveyor at an angle substantially less than said second portion all in a continuous uninterrupted manner for the full length of said pour plate to correspond to the rise/time curve of the foam;

said interdigitating fingers being mounted for relative pivoting between adjacent fingers about axes parallel to their extents to change contour of said pour plate; and means operated by associated with said fingers for supporting said fingers and relatively pivoting said fingers so as to selectively change the contour of said pour plate.

* * * * *